United States Patent [19]

Blessing

[11] 4,289,820
[45] Sep. 15, 1981

[54] FUSED BELT LOOP STRIPS

[75] Inventor: Hubert Blessing, Dallas, Tex.

[73] Assignee: Levi Strauss & Co., San Francisco, Calif.

[21] Appl. No.: 158,646

[22] Filed: Jun. 12, 1980

Related U.S. Application Data

[63] Continuation-in-part of Ser. No. 79,977, Sep. 28, 1979, Pat. No. 4,259,131.

[51] Int. Cl.³ .................... B31F 1/00; B29C 17/04; B32B 3/04; E03D 1/18
[52] U.S. Cl. ............................ 428/125; 428/245; 156/202; 156/213; 2/338
[58] Field of Search .......... 428/198, 129, 125, 245, 428/291; 2/338; 156/202, 273, 238, 234, 213, 196, 198

[56] References Cited

U.S. PATENT DOCUMENTS 3,078,469 2/1963 Lynam ............................ 428/198
3,873,403 3/1975 Edelman ............................ 2/338

OTHER PUBLICATIONS

Chemical Dictionary–Hackh's, Grant–McGraw–Hill N.Y., N.Y. ©1969.

Primary Examiner—Jerome W. Massie
Attorney, Agent, or Firm—Limbach, Limbach & Sutton

[57] ABSTRACT

A belt loop is made by folding the longitudinal edges of an elongated fabric strip over a strip of fusible material and then heating the folded strip until the fusible material diffuses into the fabric and not only bonds the folded edges to the strip but also fuses together the fabric fibers to prevent fraying.

6 Claims, 6 Drawing Figures

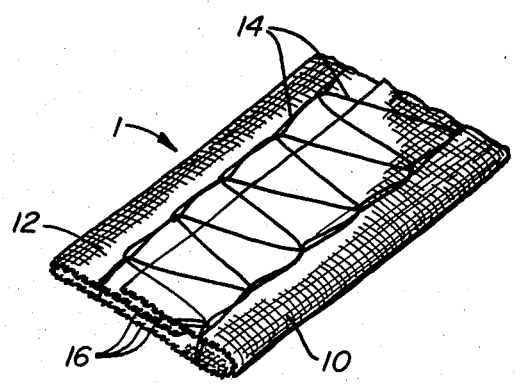
FIG.__1A. PRIOR ART
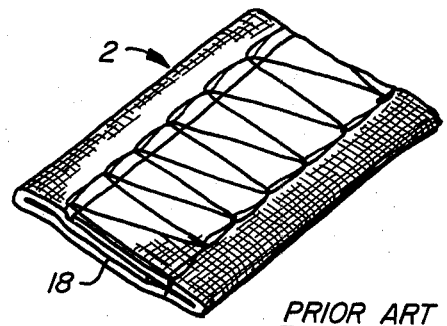
FIG.__1B. PRIOR ART
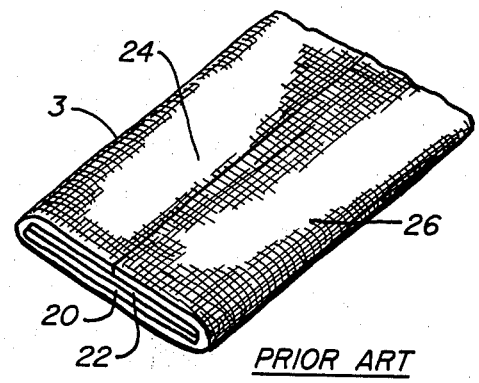
FIG.__1C. PRIOR ART
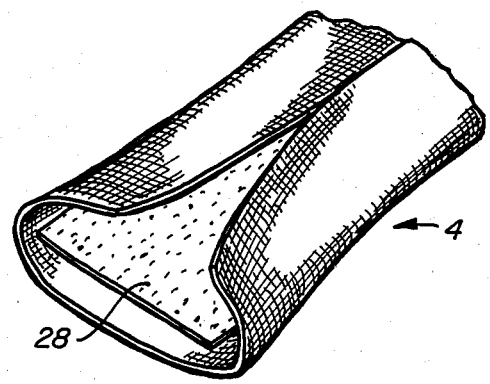
FIG.__2A.
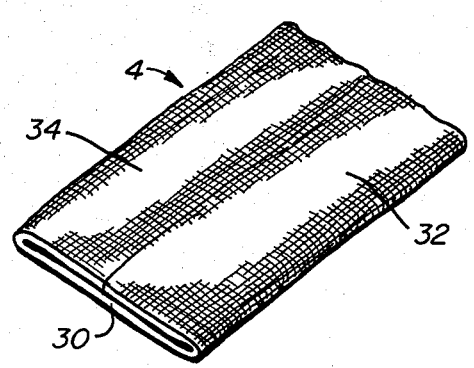
FIG.__2B.
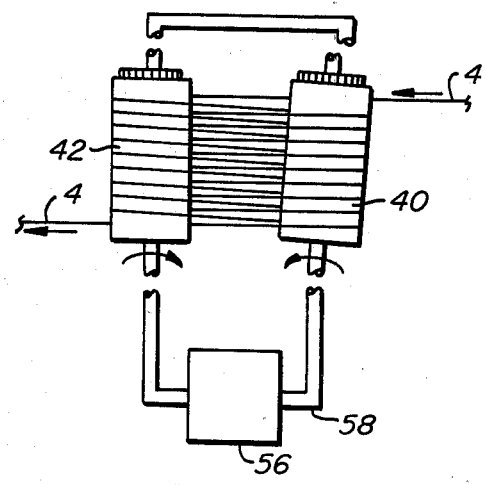
FIG.__3.

FUSED BELT LOOP STRIPS

CROSS REFERENCE TO RELATED APPLICATION

This application is a continuation-in-part of my copending application, "Method and Apparatus of Fusing Strips," Ser. No. 79,977, filed Sept. 28, 1979, now U.S. Pat. No. 4259131 the disclosure of which is incorporated herein by reference.

BACKGROUND OF THE INVENTION

This invention relates to fused strips, such as for use in straps or belt loops, for the manufacture of garments and to the method of forming such strips.

In the manufacture of garments, strips of fabric are folded over and sewn together to form garment support straps or, in some cases, loops which are then attached to the garment to support a belt. Conventional straps or belt loops are formed by folding a fabric strip over a stay and then sewing the edges of the folded fabric strip together.

One of the major drawbacks of conventional straps or belt loops is that the ends of the straps or loops are subject to fraying. Sometimes the end fraying is so extensive as to cause separation at the point at which the strap or loop is joined to the garment.

Previous attempts to overcome the problem of end fraying of straps and belt loops have not produced garments bearing the finishing touches of high quality. The most obvious solution to the problem is simply to hem the ends of the strap or loop. However, this produces bulkiness where the loops are joined to the garment. The result is particularly undesirable in the manufacture of form-fitting garments. Additionally, this method is undesirable because it hinders the mechanization of manufacture, thereby increasing the cost of the garment.

Other attempts to solve the problem of end fraying have involved dunking the ends into a liquid adhesive which is then dried to form a seal.

In still another prior method a carrier is inserted into the centerfold of the loop. The carrier is coated on only one side with a hot melt. The sides are folded over and sealed to the carrier when the melt cools and sets. This process eliminated the need for stitching the folded edges together. The hot melt sealing method, however, does not fuse the front to the back of the loop to stabilize the entire loop. It also does not prevent the problem of fraying at the ends of the loop.

SUMMARY OF THE INVENTION

The above problems are solved by the present invention, in which a fabric strip which is folded over a fusible strip and heated at the melting point of the fusible strip and below the scorching point of the fabric for a length of time sufficient to cause fusing to take place between the front and the back of the loop. The fusible strip melts into the fabric itself, fusing the individually woven fibers together. Thus, the end fibers do not slip out of the woven matrix to cause fraying.

Because all of the fibers of the loop are fused, the entire loop is stabilized. This obviously improves the appearance of the strap or loop. It also enhances the commercial operation because the long lengths of strips may be cut at any point and retain the characteristic of non-frayable ends.

As described more fully in my above referenced copending application, the heating-fusing step, in one embodiment of my invention, is accomplished by entwining the two strips together, entraining the entwined strips on two side-by-side, counter-rotating cylinders so that, in the preferred embodiment, the entwined strips describe a plurality of side-by-side figure eight patterns between the two cylinders, and heating the cylinders to the melting point of the second or fusible strip of material.

In the preferred embodiment, the entwining step comprises folding the first or fabric strip in the direction of its width about the fusible strip to form a flat, combined strip with the fusible strip constituting a core. The edges of the fabric are then sewn together in a conventional manner. In order that the same surface of the sewn, combined strip will always be in contact with the two cylinders, and to reduce the probability that a strip portion passing from one cylinder to another will contact an adjacent, corresponding strip portion, the entraining step preferably includes twisting the combined strip 180°, or an integral multiple thereof, each time the combined strip passes from the first cylinder to the second cylinder.

In the preferred embodiment, the cylinders are heated by passing a heated fluid, such as hot oil, through and in contact with the cylinders at the melting temperature of the fusible material. In other embodiments, the interior of the cylinders are heated by radiant heaters such as incandescent or infrared heaters.

In order to prevent the entrained, combined strip from creeping off of the ends of the cylinders, the axes of rotation of the cylinders are arranged to be non-parallel to each other. The spacing between the two axes of rotation is widest at the ends of the cylinders towards which the entrained strips would normally creep but for the non-parallelism.

Because the strip is drawn tight against the cylinders by their windlass action, the strip does not require further pressing to complete the fusing process.

It is therefore an object of the present invention to provide a fused together, folded fabric strip.

It is another object of this invention to provide stabilized belt loops having non-frayable ends.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 1a, 1b and 1c are enlarged cross-sectional views of prior art belt loop configurations;

FIG. 2A is an enlarged, sectional view of the unfused belt loop according to the invention;

FIG. 2B is an enlarged perspective view of the fused belt loop according to the invention; and FIG. 3 is a schematic plan view illustrating the operation of a method and apparatus for making the invention.

DETAILED DESCRIPTION OF THE DRAWINGS

FIG. 1A is a conventional belt loop 1 formed by folding fabric edge 10 over fabric layer 12 in which stitching 14 joins fabric edge 10 to fabric layer 12. Ends 16 of loop 1 are loose.

FIG. 1B is a conventional belt loop 2 formed in the same manner as in FIG. 1A having its end 18 sealed by dipping in a hot melt.

FIG. 1C is a belt loop 3 having a non-woven carrier 20 inserted in its interior and a hot melt 22 applied on top the carrier 20 over which fabric edges 24 and 26 are folded and sealed without stitching.

FIG. 2A is an unfused belt loop 4 according to this invention having a fusible material 28 inserted into the interior of the loop 4.

FIG. 2B is a fused belt loop 4 according to this invention in which the fusible 28 has completely melted into the fibers on the front 30 and back folded edges 32 and 34 of loop 4. The entire length of loop 4 is stabilized by having all fibers bonded together.

FIG. 3 is a schematic plan view illustrating a method and apparatus for making the invention.

Cylinders 40 and 42 are hollow and sealed at each end. Each cylinder contains another cylinder mounted concentrically within it to form an annular, hollow, circumferential space. These hollow, circumferential, annular spaces are interconnected by pipes 58 with a heating unit 56 which circulates a hot liquid through the cylinders. The annular space configuration minimizes temperture drops along the lengths of the cylinders. In the preferred embodiment, this hot liquid is hot oil at a temperature which is equal to or only slightly higher than the melting temperature of the fusible strip 28. This is approximately 330° to 450° F.

The composite belt loop strip 4 containing the fusible 28 passes beneath heated cylinders 40 and 42. The strip 4 passes first in a clockwise direction about the cylinder 42, leaves the cylinder 42 and then passes counter-clockwise about the cylinder 40. It next leaves the cylinder 40 and again passes beneath the cylinder 42 to again wrap about it in a clockwise direction. The fusible 28 is melted and bonded into the fibers of strip 4 as a figure eight pattern of the composite strip 4 is formed about the cylinders 40 and 42. This figure eight pattern is repeated along the length of the cylinder until approximately thirteen such figure eight patterns have been formed.

While in the above described embodiment it is not necessary to sew the butted together edges of the strip, this can still be done for decorative purposes.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:

1. A non-frayable fabric loop comprised of an elongated fabric strip of a first material whose longitudinal edges are folded over itself and a second material, whose melting point is lower than the scorching point of the first material, and which is entirely diffused between the fibers of the fabric strip, including the folded over edges, to hold them in their folded position and to fuse together the fibers of the fabric strip to prevent fraying.

2. A fabric loop as recited in claim 1 wherein the fabric is made of fibers and the fused material fuses the fibers together.

3. A fabric loop as recited in claim 1 wherein the folded over edges are butted together.

4. A fabric loop as recited in claim 1 wherein the fusible material is a synthetic and the belt loop is a non-synthetic material.

5. A fabric loop as recited in claim 1 wherein both the fusible material and the belt loop are synthetic materials.

6. A non-frayable fabric loop comprised of an elongated fabric strip of a first material whose longitudinal edges are folded over itself and a second material, whose melting point is lower than the scorching point of the first material, and which is diffused throughout the fibers of the fabric strip to fuse them together whereby fraying is prevented and the longitudinal edges of the first strip are maintained in their folded condition.

* * * * *